United States Patent [19]
Jordan

[11] 3,786,304

[45] Jan. 15, 1974

[54] DAMPING CIRCUIT FOR VERTICAL DEFLECTION SYSTEM

[75] Inventor: John D. Jordan, Chesapeake, Va.

[73] Assignee: General Electric Company, Portsmouth, Va.

[22] Filed: Sept. 28, 1971

[21] Appl. No.: 184,518

[52] U.S. Cl. .............................. 315/27 TD, 307/228
[51] Int. Cl. .............................................. H01j 29/70
[58] Field of Search ...................... 315/27 TD, 27 R, 315/28, 29, 20; 307/228

[56] References Cited

UNITED STATES PATENTS

| | | | |
|---|---|---|---|
| 2,813,225 | 11/1957 | Dietch | 315/29 |
| 3,544,810 | 12/1970 | McDonald et al. | 315/27 TD |
| 3,287,595 | 11/1966 | Entenmann | 315/27 TD |
| 2,921,230 | 1/1960 | Hopengarten et al. | 315/29 |

*Primary Examiner*—Maynard R. Wilbur
*Assistant Examiner*—J. M. Potenza

[57] ABSTRACT

An improved damping circuit for limiting the maximum voltage and slowing the rate of rise of a pulse produced by an inductive winding when current flowing therethrough is suddenly interrupted. An additional resistor is placed in series with a conventional R-C damping network and the circuit thus constituted is coupled to a switching transistor by means of a diode. Voltage across the transistor rises more slowly, and attains a lesser maximum value, than when the conventional R-C network alone is used.

2 Claims, 5 Drawing Figures

DAMPING CIRCUIT FOR VERTICAL DEFLECTION SYSTEM

BACKGROUND OF THE INVENTION

The present invention relates to pulse damping means and, more specifically, to means for lessening the magnitude and rate of rise of retrace pulses in the deflection system of a television receiver.

In producing an image upon the faceplate or screen of a television receiver, means must be provided to cause an electron beam to scan repeatedly across the face of the tube. Ordinarily, the beam is repeatedly scanned horizontally across the face of the tube in the presence of a gradual vertical deflection so as to cause the repeated horizontal deflections to substantially cover the face of the tube. At the end of such a scanning progress, or "frame," it is then necessary to redeflect the electron beam vertically in order to begin a new frame.

This operation is usually accomplished through the use of electromagnetic windings traversed by a current having a generally sawtooth form. A gradual and substantially linear increase in current causes a corresponding increase in a magnetic field through which the electron beam passes. The gradual increase in field strength then effects the desired deflection of the beam. At the end of the vertical deflection or trace period, current flow through the electromagnetic windings is abruptly terminated in order to effect a retrace of the electron beam.

The sudden cessation or interruption of current flowing through an inductive device, such as the vertical deflection windings or the transformer which supplies them, effects an inductive "kick" or pulse due to the sudden collapse of the magnetic field arising about the inductor. If not mitigated or damped, the energy induced in the device will create a voltage pulse having an extremely high voltage. The high voltage level thus produced may cause arcing, corona, or a breakdown of the system insulation. Still further, in the case of television receivers utilizing transistors to control current flow through the inductive winding, the sudden buildup of voltage may cause the transistor to break down or may produce "hot spots" at the junctions within the transistor, leading to eventual failure.

Damping circuits have been devised to limit the voltage arising across an output transistor in such a case. For smaller, and thus lower-voltage, receivers such circuits typically incorporate a unilaterally conducting device such as a diode coupled in series with the parallel combination of a resistor and a capacitor. The aforementioned circuit is then coupled between the intersection of the transistor and inductor, and a point of reference potential such as ground. When the transistor suddenly ceases to conduct, the resulting voltage pulse forward-biases the diode and current flows through the resistor to ground, charging the capacitor to substantially the voltage of the pulse. During the intervening trace period, the charge from the capacitor bleeds through the resistor, discharging the capacitor to an extent determined by the R-C time constant of the circuit. Upon the occurrence of the next retrace pulse the diode is forward-biased to allow current to flow as soon as the pulse voltage exceeds the voltage remaining across the capacitor.

Such damping circuits, while often satisfactory for low-voltage applications such as in small television receivers operating at comparatively low voltage levels, have been found deficient in larger, higher-voltage receivers. In order to limit voltage adequately with such a circuit, larger capacitors have been thought to be needed. In addition to being relatively expensive, the necessarily larger capacitors prolong the retrace period beyond desired limits. For these reasons, and in order to provide pulse damping means at an acceptable cost, many designers have been forced to utilize voltage dependent resistors in the deflection circuit for shunting the induced retrace pulses about an output transistor. Nonetheless, the high voltages and rapid rates of voltage rise which thus must be withstood by the output transistor necessitate the use of an expensive, high-voltage transistor.

It will therefore be seen that it would be desirable to provide improved damping means which mitigate the rise rate of a retrace pulse and limit its magnitude to a value allowing the use of an inexpensive, lower-voltage transistor.

It is therefore an object of the present invention to provide a damping circuit which prevents the occurrence of undesirably high voltages across an output transistor without utilizing a relatively large, expensive capacitor.

It is another object of this invention to provide improved voltage damping means which facilitates the use of economical, relatively low-voltage transistors in the output stage of a vertical deflection system.

SUMMARY OF THE INVENTION

Briefly stated, in accordance with one aspect of the invention the foregoing objects are achieved by connecting an improved damping circuit to one terminal of an output transistor. The improved damping circuit comprises the series combination of a diode, a first resistor, and a second resistor and capacitor connected in shunt. At the initiation of the pulse, the capacitor charges to a somewhat higher voltage than with prior-art circuits not utilizing the first, series resistor; the rate of charge then decreases and the capacitor is thereafter charged to a maximum voltage. The maximum voltage thus attained in substantially less than would be the case were the first, series resistor not present, and the initial rise rate of the voltage pulse is lessened.

BRIEF DESCRIPTION OF THE DRAWING

While the specification concludes with claims particularly pointing out and distinctly claiming the subject matter which is regarded as the invention, it is believed the invention will be better understood from the following description of the preferred embodiment taken in conjunction with the accompanying drawing in which:

DESCRIPTION OF THE PREFERRED EMBODIMENT

Figure 1:
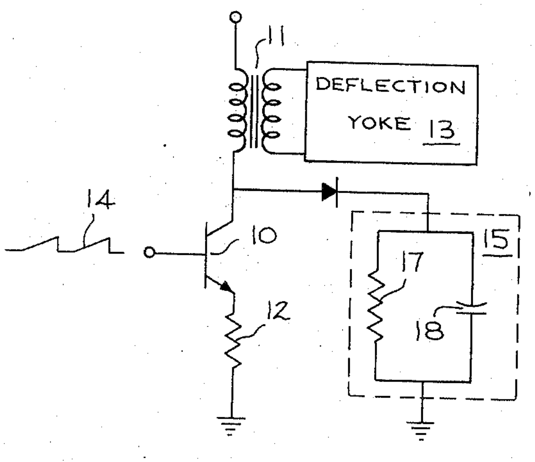
PRIOR ART FIG. 1
FIG. 1 is a schematic drawing of a portion of a vertical deflection system including a typical damping circuit utilized in the prior art.

Referring now to FIG. 1, a portion of the vertical output system of a television receiver circuit is disclosed, including a vertical output transistor 10 coupled in series with the primary winding of a vertical output transformer 11, and an emitter resistor 12. As will be understood by those skilled in the art, vertical output transformer 11 supplies a sawtooth current to a deflection yoke 13 which serves to periodically deflect an electron beam across the screen of a cathode ray tube. Vertical drive circuitry (not shown) applies a sawtooth control signal 14 to the base terminal of output transistor 10 for causing the output transistor to periodically pass a linearly increasing current through the primary winding of vertical output transformer 11. At the end of each sawtooth wave, the control signal falls to a value which causes soutput transistor 10 to suddenly cease conducting. The sudden cessation of current flow through an inductive device such as the primary winding of output transformer 11 is opposed by the magnetic field arising about the windings. As current flow ceases the field collapses, inducing a voltage in the primary winding which tends to perpetuate current flow. In the present instance, when current flowing downwardly from the primary winding of output transformer 11 to the collector of output transistor 10 is terminated it causes a large positive voltage pulse to arise at the collector. If not somehow mitigated or damped, the rapidly increasing voltage pulse may forward-bias output transistor 10 and cause it to break down and conduct. Since this activity occurs during the retrace portion of the video signal, retrace of the electron beam within the cathode ray tube would thereby be frustrated. Moreover, prolonged exposure to such pulses may permanently damage output transistor 10.

In order to prevent this, the damping circuit indicated generally at 15 is provided. A diode 16 couples the damping circuit to the collector terminal of output transistor 10. The parallel combination of a resistor 17 and capacitor 18 are connected between the cathode of diode 16 and a point of common potential, herein shown as ground. Thus far the described damping circuit is entirely conventional, and is used in many small screen television receivers. Upon the production of a positive-going voltage pulse at the collector terminal of output transistor 10, diode 16 is forward-biased and begins to conduct current to the R-C circuit comprising resistor 17 and capacitor 18. This serves to prevent the occurrence of a voltage pulse across transistor 10 of sufficient magnitude to cause it to break down and substantially vitiate the necessary retrace signal in deflection yoke 13. Current flowing through diode 16 rapidly charges capacitor 18 until the R-C circuit has absorbed nearly all the energy which was stored in the primary winding. As the pulse terminates, the voltage across capacitor 18 back-biases diode 16 so that it does not affect the operation of output transistor 10 during trace periods. During the trace periods capacitor 18 discharges through resistor 17, the voltage thereacross diminishing such that diode 16 will again be forward-biased upon the production of the next retrace pulse at the collector of output transistor 10.

It will be appreciated that by varying the values of resistor 17 and capacitor 18, characteristics of the voltage pulse arising at the collector terminal of transistor 10 may be varied. Many criteria are involved in determining the values of these components; the magnitude of the voltage pulse to be supported across the damping circuit, and thus appearing at the collector of transistor 10 during retrace; the duration of the pulse thus supported; and the relative cost of the elements of the damping circuit. Another factor which determines the maximum voltage to be allowed at the collector of transistor 10 is the cost of the transistor, a more expensive transistor being capable of supporting a substantially higher voltage thereacross without experiencing failure. Such a transistor, moreover, can withstand a much more rapidly voltage rise across its terminals without experiencing hot spots at its junctions. In practice, for smaller receivers, the relatively low voltages encountered during retrace may be damped by an economical R-C circuit such as that of FIG. 1. A relatively small capacitor 18 may be used in conjunction with a properly-sized resistor 17 for mitigating the size of the retrace pulse, and still allow the use of a relatively inexpensive output transistor 10. However, for larger receivers, the increased voltages necessary for proper deflection eventuate in the production of a much larger retrace pulse at the collector of the output transistor. The increased energy thus produced can be accomodated through the use of a much larger capacitor 18 coupled with a commensurately larger resistor 17. However, a damping circuit thus constructed is not commercially feasable due to the substantially higher cost of providing a larger capacitor. Further, the retrace period may be unduly prolonged by the use of a larger capacitor.

Figure 2:
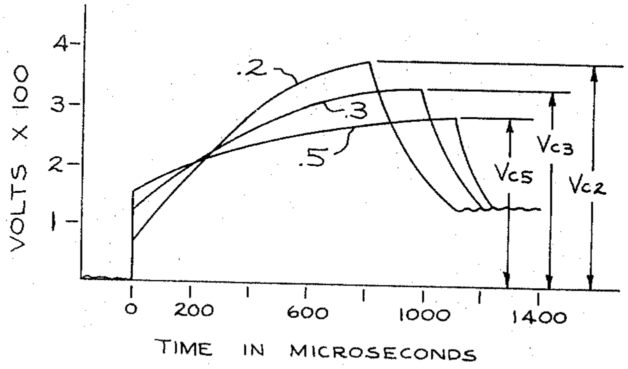
FIG. 2 is a plot of voltage waveforms arising across portions of the circuit of FIG. 1 for different values of circuit elements therein.

FIG. 2 is a plot of a family of curves showing voltages arising at the collector of an output transistor connected in the vertical deflection circuit of a 19-inch monochrome receiver in the manner shown in FIG. 1, for various values of damping capacitor 18. Each of the curves is labeled with the value of the capacitor used in a damping circuit, the values being given in microfarads. It will be seen that for the smallest capacitor utilized, 0.2 microfarad, collector voltage rises sharply at the beginning of the retrace period until it equals the residual voltage upon capacitor 18. The voltage then rises at a much slower rate until it attains a maximum voltage $V_{c2}$. When a somewhat larger capacitor of 0.3 microfarad is substituted in the damping circuit the initial, steep voltage rise continues to approximately twice the value of that attained with the smaller capacitor. The rate of voltage rise then diminishes, the collector terminal eventually attaining a maximum voltage $V_{c3}$ which is substantially less than $V_{c2}$. It will be noted, however, that retrace time has increased from approximately 1,100 microseconds to 1,200 microseconds.

When a still larger capacitor having a value of 0.5 microfarad is substituted in the damping circuit the initial, steep voltage rise continues to a value somewhat higher than that attained with the smaller capacitors. The rise rate then diminishes to attain a maximum voltage $V_{c5}$ which is substantially less than that attained with the smaller capacitors. In this case, retrace time is prolonged to approximately 1,300 microseconds. This is a basic consideration in deflection systems, since retrace is completed before a new trace can be initiated. If unduly prolonged, the expanded retrace period can result in a double trace or foldover of video information occurring at the top of the raster.

It has been noted that the voltage attained at the initial, rapid rise rate shown in FIG. 2 is substantially greater for a larger capacitor than for a smaller capacitor. This is due to the fact that, when using a smaller capacitor, the time constant of the damping circuit is substantially shorter than when a larger capacitor is used. For a given resistance, a smaller capacitor discharges during the trace period to a far greater degree than a large one so that the residual voltage appearing across the capacitor at the end of the trace period is substantially less. The voltage remaining across the capacitor at the start of the retrace pulse is thus substantially lower for the case of a smaller damping capacitor than for a larger one.

The voltage appearing on the collector of the output transistor rises in accordance with the voltage produced by the primary winding of output transformer 11 only until the residual voltage across damping capacitor 18 is equaled. When a substantially larger capacitor is substituted in the damping circuit, the time constant of the circuit is extended so that during trace intervals the capacitor discharges more slowly than when a smaller capacitor is used. Therefore, at the beginning of a retrace period the residual voltage still appearing across the damping capacitor is substantially greater than would be the case were a smaller capacitor to be utilized. The voltage appearing at the collector of the output transistor is now constrained to follow the voltage produced by the primary winding of the output transformer until the voltage remaining upon the damping capacitor is equalled. At this point, corresponding to the sudden break or "knee" of the curves of FIG. 2, capacitor 18 begins to charge, absorbing the energy produced by the primary winding. If a substantially larger capacitor is provided to absorb the fixed amount of inductive energy produced, it charges to a substantially lesser, maximum voltage than would a small capacitor. The maximum voltage appearing at the collector terminal of the transistor to which the damping circuit is coupled may thus be lowered substantially through the use of a larger, and therefore more expensive, damping capacitor.

Figure 3:
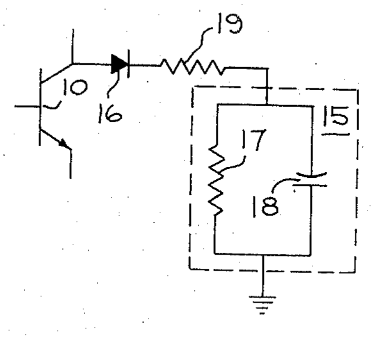
FIG. 3 is a schematic drawing of an improved damping circuit utilizing the principles of the present invention.

Referring now to FIG. 3, there is shown a damping circuit constructed in accordance with the present invention. A diode 16 couples the damping circuit to a point at which voltage is to be limited, such as the collector of a vertical output transistor 10. The parallel combination of a capacitor 18 and a resistor 17 are provided. However, in accordance with the present invention a series resistance 19 has been inserted between the parallel R-C circuit and the point at which the voltage is to be damped, herein shown as the collector terminal of transistor 10. As will be hereinafter demonstrated, the retrace voltage arising across the output transistor actually is lessened by the modified circuit of FIG. 3 despite the fact that the total impedance of the damping circuit has been increased.

Figure 4:
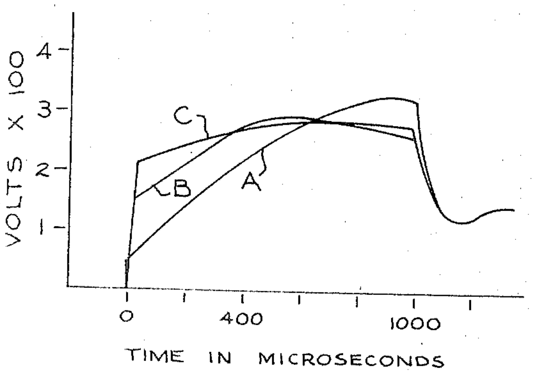
FIG. 4 is a plot of comparative voltage waveforms illustrating the effect of the present invention.

FIG. 4 graphically demonstrates the effect of the added series resistance 19 retrace voltage. Curve A is a plot of the voltage arising at the collector of a vertical output transistor when connected in a circuit similar to that shown in FIG. 1 and placed in a 19-inch monochrome receiver. At the start of a retrace period, the voltage at the collector rises suddenly to a value of approximately 60 volts. At this point transistor 10 substantially ceases to conduct, and the total current produced by the inductance of the deflection system is absorbed by the damping circuit. This voltage rise is then mitigated by the R-C circuit and proceeds at a substantially slower rate. The voltage level peaks at substantially 330 volts, indicating that energy in the primary winding is substantially exhausted. The voltage then begins to decline, and the diode 16 is back-biased as a new trace period begins. It will be understood that while the voltage at the collector of transistor 10 drops suddenly, the voltage across the damping circuit decays more slowly, corresponding to the well-known R-C characteristic.

When resistor 19 is interposed between the collector terminal of transistor 10 and the damping circuit 15, however, a substantially different voltage waveform appears. As shown by curve B of FIG. 4, voltage at the collector terminal rises rapidly to a value in excess of that originally reached, approximately 160 volts in the circuit tested. At this point current flow through transistor 10 is substantially cut off and capacitor 18 begins to charge, mitigating the voltage rise at the collector terminal of the transistor. This time, however, the voltage rise continues at a rate substantially slower than that of curve A. The maximum voltage attained by practicing the present invention, as illustrated by curve B, is now only about 270 volts or a decline in maximum voltage of approximately 20 percent. This is so despite the fact that the total impedance across the damping circuit is substantially larger than was the case for curve A.

It will be recalled that the maximum voltage attained may also be lowered by utilizing a larger capacitor in the damping circuit. It was shown in FIG. 2 that this normally is accompanied by a prolongation of retrace time. The retrace time, however, may be shortened by utilizing a shunt resistor 17 having a suitably larger value. Curve C of FIG. 4 illustrates the optimum condition for such a prior-art type of damping circuit. An R-C combination was selected which provided a maximum voltage substantially the same as that attained by adding series resistor 19 to the original R-C damping circuit. A suitable large shunt resistor 17 was utilized to maintain the desired retrace time. In the circuit tested, it was necessary to enlarge capacitor 18 to a value of 0.82 microfarad, while substantially doubling the value of shunt resistor 17.

Ignoring the economic disadvantages which inhere in the provision of the larger capacitor, it will be seen from FIG. 4 that a new disadvantage occurs in that the initial, rapid voltage rise for curve C continues to a value of approximately 220 volts, approximately 50 percent greater than that experienced with the original damping circuit and series resistor 19 as represented by curve B.

It will now be understood that, even ignoring the economic advantages of the inventive circuit, the results which it produces are not attainable by varying the values of a pure R-C damping circuit since, in order to attain one desideratum, it is necessary to "trade off" and accept other, less desirable characteristics.

Figure 5:
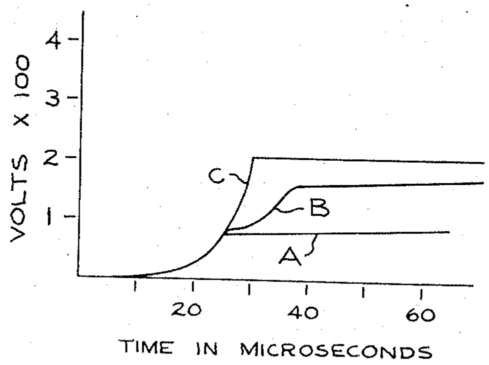
FIG. 5 is a portion of the curves of FIG. 4 plotted on an expanded time scale.

Turning now to FIG. 5, the initial, rapid voltage rise of the curves of FIG. 4 are displayed upon an expanded time scale. The rate at which voltage at the collector of the output transistor rises before forward-biasing diode 16 is more clearly seen. Once the diode is forward-biased current from the inductor flows at a predetermined rate, represented by the portion of the curve having a substantially lowered rise rate. With the prior-art R-C damping network, represented by curve A, a relatively low initial voltage of approximately 65 volts is attained at a rise rate determined by current flowing from the inductive winding, and the turn-off rate of the output transistor 10. For the optimized prior-art damping circuit represented by curve C, however, the initial rise illustrated by curve A continues at an even more rapid rate until a voltage of substantially 200 volts is reached. As discussed above, the increased time constant of the optimized prior-art damping circuit causes a greatly enlarged residual voltage to occur such that a higher voltage is required to forward-bias diode 16 at the beginning of a retrace pulse. Once diode 16 is forward biased, however, the rate of voltage rise decreases markedly and thereafter becomes a function of current flow from the inductive winding.

When utilizing the inventive damping circuit, represented by curve B, it will be seen that although a substantially higher initial voltage is attained than was the case with the curve A, the maximum of approximately 150 volts is still substantially less than was encountered with the optimum R-C arrangement illustrated by curve C. More importantly, the overall voltage rise rate is obviously substantially less than in curve C. Since the damping circuit utilized with the inventive arrangement to generate curve B has a shorter time constant than did the optimum prior-art circuit, the residual voltage is therefore lower. This accounts for the fact that a first "knee" occurs in curve B at the same voltage as it did in curve A. At this point, diode 16 begins to conduct. However, due to the voltage drop which now arises across resistor 19, the voltage arising at the collector of output transistor 10 increases still further to approximately 150 volts. This increase occurs at a much-reduced rate so that the probability of the occurrence of junction failures, or hot spots, within transistor 10 is substantially reduced. It will therefore be seen that the results produced by the improved damping network are not attainable by merely modifying the values of the prior-art R-C damping network components.

The advantages flowing from the inventive damping network are manifold. The present invention allows the use of an output transistor which need withstand a substantially smaller maximum voltage than would be the case with an equivalent prior-art damping network. Further, although a higher initial voltage is experienced through the introduction of the series resistor 19, the rise rate is mitigated to such an extent that it does not require the use of special switching-type transistors.

Thus, it will be seen that the present invention allows the use of an output transistor which need withstand a substantially smaller maximum voltage than would ordinarily be the case. In some cases, the lower maximum voltage attained by using the inventive damping circuit allows the use of a much less expensive output transistor, since the improved damping circuit may bring the maximum expected voltage level to a range which may be controlled by a lower-rated power transistor. Further, a result heretofore only achieved by the substitution of a large and expensive capacitor may now be achieved by the simple insertion of a relatively inexpensive resistor, providing a further economic benefit. Such a circuit is well adapted for use in higher voltage environments such as are found in relatively large-screen television receivers, replacing the voltage dependent resistors which are now commonly utilized.

While it will be understood that the values of various circuit components may be varied to suit a particular application, the following values of circuit components are given by way of example:

Resistors:
- 12 — 22 ohms
- 17 — 47 kilohms
- 19 — 820 ohms

Capacitor 18 — 0.22 microfarad
Transistor 10 — MJE 2360 (Motorola)
Diode 16 — A 14 (General Electric)

As will be evident from the foregoing description, certain aspects of the invention are not limited to the particular details of the example illustrated. For instance, it may be desirable to change the values of various resistors and capacitors to obtain a more suitable time constant, or to support a greater or a smaller voltage pulse thereacross. It is accordingly intended that the appended claims shown cover all such modifications and applications as do not depart from the true spirit and scope of the invention.

What is claimed as new and desired to be secured by Letters Patent of the United States is:

1. In a deflection system for a television receiver having a transistor driver for driving a deflection yoke, a damping circuit for limiting the maximum voltage and the rate of rise of the retrace pulses appearing across said transistor, comprising:

a time constant circuit responsive to said voltage retrace pulses to store the energy thereof at a given rate up to a maximum voltage;

coupling means conductive to couple said voltage retrace pulses to said time constant circuit when said pulses exceed a predetermined level of voltage stored by said time constant circuit, and resistor means coupled between said coupling means and said time constant circuit to reduce the rise time of voltage pulses appearing across said transistor without increasing the maximum voltage of said pulses.

2. A damping circuit as recited in claim 1 wherein said coupling means is a diode permitting the operation of said damping circuit during retrace periods but not during trace periods of operation of said deflection system.

* * * * *